Aug. 29, 1950 — W. SNIEZYK — 2,520,698
TRAILER FOR HAULING AUTOMOBILES
Filed Aug. 10, 1948 — 2 Sheets-Sheet 1

INVENTOR:
Walter Sniezyk,
BY Louis Chayka
ATTORNEY.

Aug. 29, 1950 W. SNIEZYK 2,520,698
TRAILER FOR HAULING AUTOMOBILES
Filed Aug. 10, 1948 2 Sheets-Sheet 2
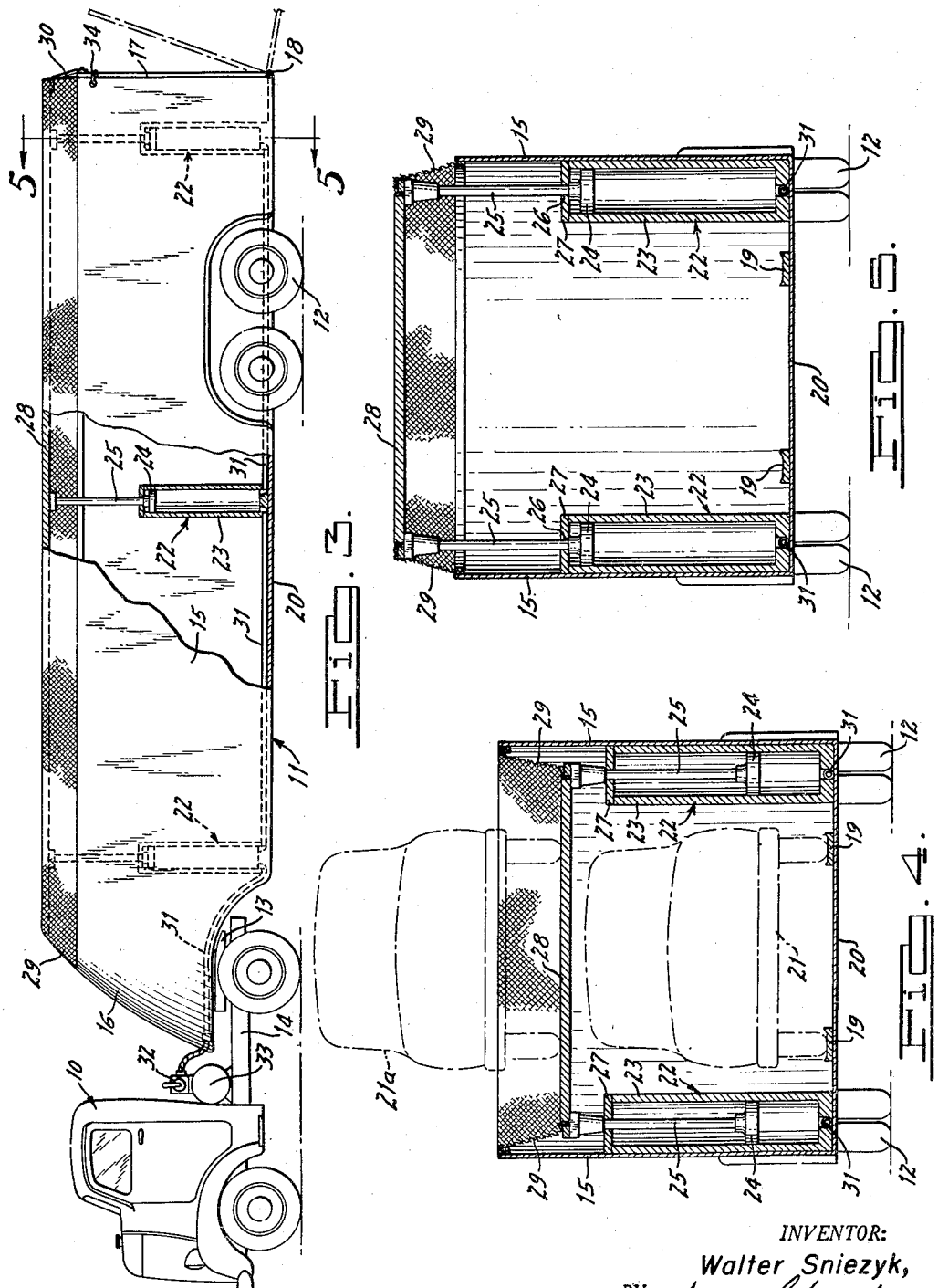
INVENTOR:
Walter Sniezyk,
BY Louis Chayka
ATTORNEY.

Patented Aug. 29, 1950

2,520,698

UNITED STATES PATENT OFFICE 2,520,698

TRAILER FOR HAULING AUTOMOBILES

Walter Snilezyk, Detroit, Mich.

Application August 10, 1948, Serial No. 43,369

2 Claims. (Cl. 296—1)

My improvement pertains to trailers for delivery of automobiles. More specifically it refers to trailers in which automobiles may be stacked up in two rows vertically, a number of automobiles being disposed on one level and a number on a level above. The conventional trailers now in use are limited to that purpose alone so that on a return trip the trailers are empty, with a resulting waste of space which otherwise might be adapted to carrying a paying load. I have therefore devised a trailer which, while capable of hauling automobiles, may also be used for hauling any merchandise that may be conveniently loaded into ordinary box type trucks and trailers. In designing my trailer I have taken care to make it structurally simple and easy to make, and yet fully practical and adapted for utilization of its great loading capacity.

I shall now refer to the accompanying drawings in which

Fig. 3 is a side elevational view of said truck and my trailer with a part of the sidewall of said trailer broken off to disclose structural elements within;

Fig. 4 is a sectional view on line 4—4 of Fig. 2;

Fig. 5 is a sectional view on line 5—5 of Fig. 3;

Similar numerals refer to similar parts throughout the several views.

Figure 1:
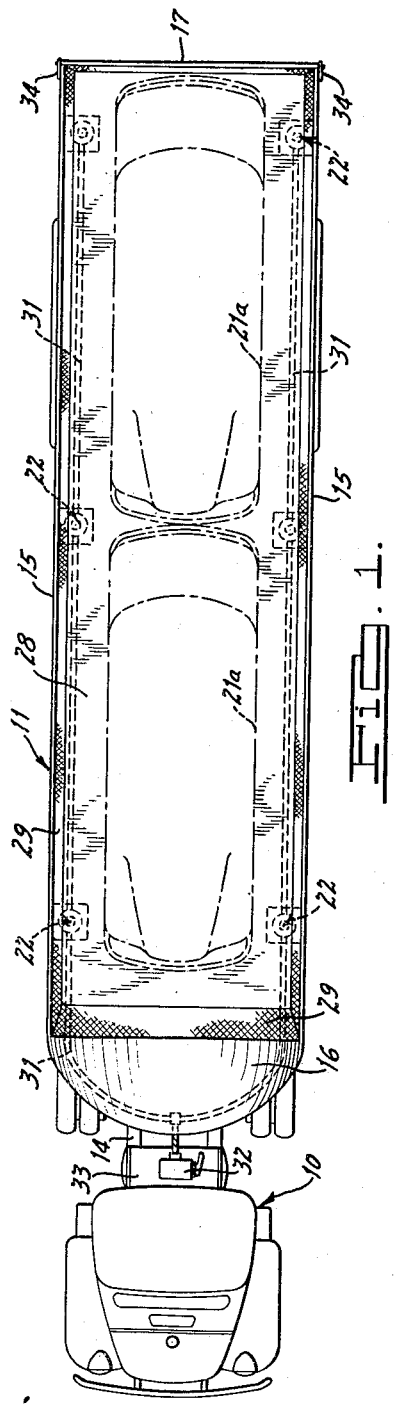
Fig. 1 is a top elevational view of a truck and my trailer attached thereto, the view disclosing in dotted lines automobiles carried therein.
Figure 2:
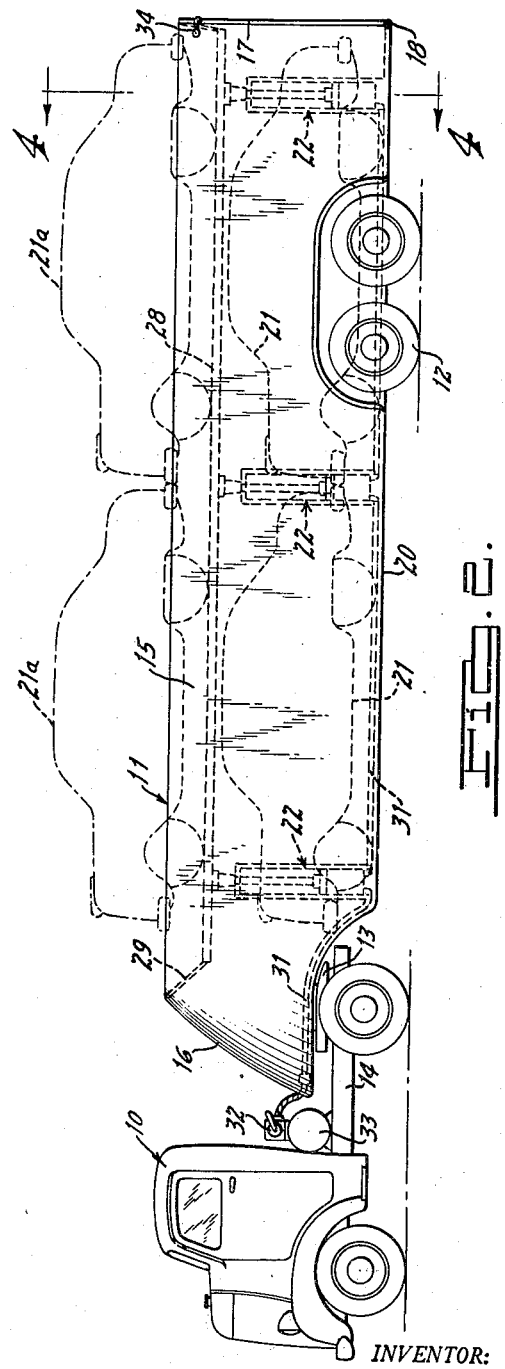
Fig. 2 is a side elevational view of said truck and trailer with dotted outlines of automobiles carried therein on two levels, one above the other.

The trailer improved by me and shown in the drawings with a truck 10 designed to pull it, is generally indicated by numeral 11. It is made in the form of an oblong rectangular body supported at the rear on wheels 12 and pivotally supported at the front by means of a turntable device 13 upon the floor 14 of said truck 10. The sides 15 and the front wall 16 which is arcuate in shape as best shown in Figs. 1 and 2, are of rigid construction while the rear may be provided with a door 17, preferably a drop door which, hinged at the bottom 18, may be swung downwardly from the hinges so as to provide an incline leading to the floor 20. A pair of rails 19 disposed in a parallel spaced relation to each other on said floor 20 provide a firm support for individual automobiles 21.

Disposed upon the floor along each sidewall of the trailer are a plurality of hydraulic jacks generally indicated by numeral 22. Each jack is made up of an upright cylinder 23 having therein a slideable piston 24, serving as a base for a rod 25 extending upwardly through an aperture 26 in a top closure 27 of said cylinder. Supported on the outer thickened ends of said rods is a solid platform 28, the platform being rectangular in shape but somewhat shorter and narrower than said floor 20. The sides and the front end of the platform are connected by means of flexible textile fabric 29 to the sides and the front walls of body 11 of the trailer along the upper rim thereof. At the rear, a separate strip 30 of flexible textile fabric is affixed to the underside of said platform 28 for a purpose which will be described later on.

The jacks are operated by hydraulic means, such medium as oil being conveyed thereto by means of pipes 31 from a pump 32 located on top of tank 33 which is mounted on the floor 14 of truck 10. The pump may be operated by the engine of the truck. The respective operative connection of the pump to the engine and the arrangement whereby oil may be supplied to the jacks and conveyed therefrom to the tank, are well known and need no description.

I wish now to describe the manner of use of my trailer.

To load the automobiles upon the lower floor of the trailer, platform 28 has to be raised upwardly to a position shown in Fig. 5. This, of course, will be effected by causing the pistons 24 to be forced upwardly in the respective cylinders 23 under the pressure of oil pumped into the cylinders by pump 32. When the platform 28 is in a fully raised position, there will be ample space therebelow to drive automobiles 21 upon rails 19 on floor 20 of the trailer, the automobiles being arranged in a row, one after another. Once these automobiles are in position, and secured against displacement by suitable means, customarily used, but which are no part of this invention, platform 28 may be lowered by withdrawal of oil from cylinders 23. This will cause pistons 24 to be lowered in the respective cylinders 23 till the descent of said pistons will be checked by the respective top closures 27 of said cylinders. When platform 28 is in its low position as shown in Fig. 4, a number of automobiles may be loaded thereon as shown in Figs. 2 and 4. Again, the automobiles marked 21a and disposed on platform 28, have to be secured against rolling off by suitable means such as wedges under the wheels, braces, etc. according to the best known practice along these lines.

At this point particular attention is requested to the respective positions of the textile fabric 29 both when the platform is in its low position as shown in Fig. 4 and when it is in its high position as shown in Fig. 5. It will be noted that, when the platform is in the last named position, the fabric, in conjunction with the platform, will form a roof for the trailer, the top of the roof being formed by the platform itself, with the sides of the roof as made by the said fabric sloping downwardly to the sides 15 of the trailer, the front portion of the fabric sloping similarly to the front of the body of said trailer.

To cover the space at the rear above the upper rim of the door 17 I am using an extra sheet of fabric 30 which, as above described, is affixed to the rear end of platform 28 and may be secured along the lower rim to the door by means of snaps, clamps, hooks or any other suitable means. As a result, the trailer will be converted into a fully covered body into which a large quantity of merchandise may be loaded and adequately protected against all weather conditions. It will be understood that some changes may be made in the structural design of my trailer without departing from the inventive principle disclosed herein.

What I, therefore, wish to claim is as follows:

1. A wheel supported trailer for hauling automobiles, the trailer comprising an oblong body open at the top and having vertical walls, a stationary floor within the body, a plurality of hydraulic jacks on the floor, a platform supported by the jacks and normally disposed below the upper rim of the body, fabric means connecting the outer edges of the platform with the top rim of the body, means to operate the jacks to raise the platform above the upper rim of the body to make the platform and the fabric means form a roof for said trailer, and a door means in the body allowing access to the floor and to the platform.

2. A trailer having an oblong body including vertical walls, a floor within, a rectangular platform above the floor in a space relation thereto and normally disposed below the level of the upper rim of the body, hydraulic jacks within the body to raise the platform above the level of said rim, flexible fabric members between the edges of the platform and the rim to serve with the platform as a roof for the trailer when said platform has been raised to its uppermost position, door means for the body, and means to operate said jacks.

WALTER SNIEZYK.

REFERENCES CITED

The following references are of record in the file of this patent:

UNITED STATES PATENTS

| Number | Name | Date |
|---|---|---|
| 2,168,069 | Miller | Aug. 1, 1939 |
| 2,202,747 | Roloson | May 28, 1940 |